Patented June 20, 1944

2,351,833

UNITED STATES PATENT OFFICE 2,351,833

N(ALKYL,β-4-MORPHOLYLALKYL) AMINOALKANOL ESTERS

Elmore Hathaway Northey and Martin Everett Hultquist, Bound Brook, N. J., assignors to American Cyanamid Company, New York, N. Y., a corporation of Maine No Drawing. Application April 8, 1942, Serial No. 438,115

6 Claims. (Cl. 260—247)

The present invention relates to N(alkyl,β-4-morpholylalkyl) aminoalkanol esters of carbocyclic substituted aliphatic carboxylic acids.

N-disubstituted aminoalcohols form alkamine esters of various carbocyclic substituted aliphatic carboxylic acids which are of considerable commercial importance particularly with respect to the monobasic acids. The exact properties and consequently the uses to which they may be put depend upon the particular acid and particular aminoalcohol which go to make up the ester. The new compounds of the present invention, the esters of the new N(alkyl,β-4-morpholylalkyl) aminoalkanols and dicarbocyclic substituted aliphatic carboxylic acids are analogous to the morpholino-alkanol esters of our copending application Serial No. 438,114, filed April 8, 1942. Several of the compounds of the present invention show marked hypnotic and sedative properties and are characterized by an extremely low toxicity. Several of the compounds in addition are useful as modifiers in the vulcanization of natural and synthetic rubber.

The compounds of the present invention may be represented by the type formula

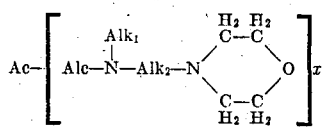

in which Ac is an acyl radical of a mono or polybasic acid, Alc is an alcohol residue, $Alk_1$ is an alkyl radical, $Alk_2$ is the residue of the same or a different alkyl radical and $x$ is a small whole number. Ac may be any dicarbocyclic-substituted monobasic or polybasic acyl radical such as diarylacetyl, alkoxydiarylacetyl, diarylpropionyl, dialicyclicacetyl, aryl-alicyclicacetyl, diarylsuccinyl and the like or may be hydroxy-substituted acyls such as benzilyl, tolilyl, anisilyl, naphthilyl and the like. $x$ is usually 1 or 2 although polybasic acyl groups having more than two (COOH) groups such as corresponds to citric acid are within the contemplation of the present invention.

These esters in general are oily liquids insoluble in water and soluble in alcohol, acetone and benzene. They are usually more conveniently handled in the form of their salts which may be easily prepared since the esters themselves are basic in reaction. The hydrochlorides, for example, are in general white crystalline salts, usually soluble in water. If so desired other salts such as the nitrate, sulfate, hydrobromide, tartrate, citrate and the like may be readily prepared.

Quaternary derivatives such as the methiodide, ethobromide and the like may also be readily made by first treating the base in an alcohol solution with a compound such as methyl or ethyl bromide and precipitating the salt.

The invention will be more fully set forth in connection with the following examples which are illustrative only and not by way of limitation. All parts are by weight unless otherwise noted.

EXAMPLE 1

*Preparation of N(ethyl,β-4-morpholylethyl)-aminoethanol*

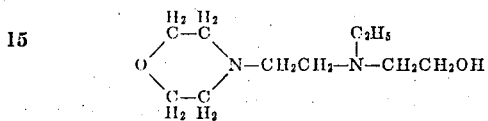

N-β-aminoethyl morpholine was reacted with acetaldehyde and the reaction product reduced with metallic sodium in ethyl alcohol. The product, N-β-ethylaminoethyl morpholine, was then treated with ethylene oxide to produce the N(ethyl,β-4-morpholylethyl) aminoethanol.

EXAMPLE 2

The procedure of Example 1 was repeated, substituting ethylene chlorohydrin for the ethylene oxide. The product was identical with that of Example 1.

EXAMPLE 3

*Preparation of γ-N(ethyl,β-4-morpholylethyl)-aminopropanol*

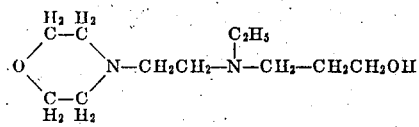

The procedure of Example 1 was repeated substituting 1-3 propylenechlorohydrin for the ethylene oxide the product was γ-N(ethyl,β-4-morpholylethyl) aminopropanol.

In a similar manner any aminoalcohol falling within the general formula R—OH may be built up in which R represents the group

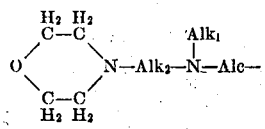

in which the substituents have the same meaning given above. $Alk_2$ may be varied by starting with the appropriate N-aminoalkylmorpholine.

Alk₁ may be varied by using the proper aldehyde. Alc may be varied by using the appropriate alkylene oxide or chlorohydrin. Where Alc is the residue of an n-alcohol, the proper chlorohydrin should be used since the alkylene oxides having more than 2 carbon atoms produce iso-alcohols.

EXAMPLE 4

N(ethyl,β-4-morpholylethyl)aminoethyl diphenylacetate

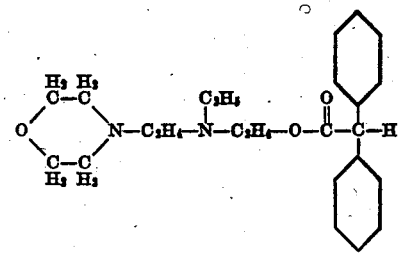

36 parts of diphenylacetyl chloride were dissolved in 150 parts of benzene and brought to a temperature of reflux. 63 parts of N(ethyl,β-4-morpholylethyl)aminoethanol were then gradually added and the mixture refluxed until the reaction was completed. The mixture was then cooled to room temperature, the precipitated N(ethyl,β-4-morpholylethyl)-aminoethanol hydrochloride filtered out and the benzene evaporated under reduced pressure. The residue comprising the ester base was left behind as a viscous light brown liquid.

EXAMPLE 5

N(ethyl, β-4-morpholylethyl)aminoethyl diphenylacetate hydrochloride

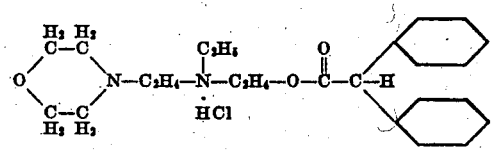

The product of Example 4 was dissolved in dry ether and hydrogen chloride gas bubbled through until precipitation was complete. Crystals were collected and purified by recrystallization from an alcohol-acetone-ether solution. The purified product appeared as colorless fluffy crystals melting at 138–139° C.

EXAMPLE 6

N(ethyl, β-4-morpholylethyl)aminoethyl α,α-di-p-tolylpropionate

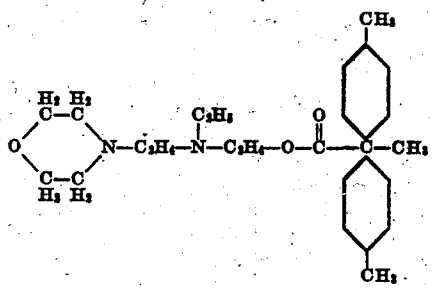

17 parts of α,α-di-p-tolylpropionyl chloride were dissolved in 60 parts of benzene to which were added 25 parts of N(ethyl, β-4-morpholylethyl)aminoethanol and the mixture refluxed until the reaction was substantially completed. After cooling to 20° C. the precipitated N(ethyl, β-4-morpholylethyl)aminoethanol hydrochloride was removed by filtration and the residual benzene distilled off under reduced pressure. The ester base remained as a viscous yellowish brown liquid.

EXAMPLE 7

N(ethyl, β-4-morpholylethyl)aminoethyl α,α-di-p-tolylpropionate hydrochloride

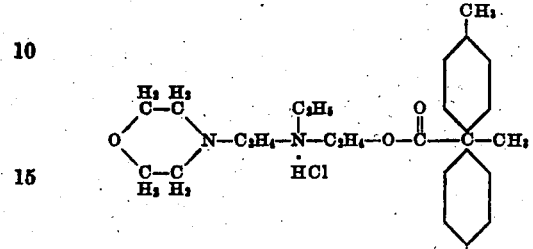

The product of Example 6 was subjected to the treatment of Example 1. The product appeared as colorless crystals melting at 194–196° C.

EXAMPLE 8

γ-N(ethyl, β-4-morpholylethyl)aminopropyl diphenylacetate

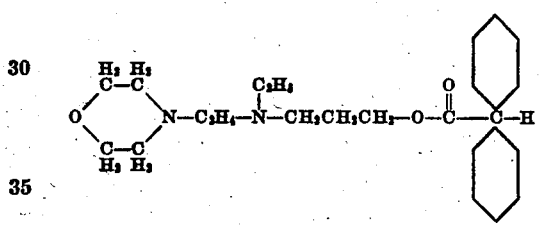

64 parts of the γ-N(ethyl, β-4-morpholylethyl)aminopropanol were slowly added to a refluxing solution of 36 parts of diphenylacetyl chloride in 100 parts of benzene and the mixture refluxed until the reaction was completed and then cooled to room temperature. The γ-N(ethyl, β-4-morpholylethyl)aminopropanol hydrochloride which precipitated was filtered out and the benzene removed under reduced pressure. The residual product, a heavy viscous liquid was γ-N(ethyl, β-4-morpholylethyl)aminopropyl diphenylacetate.

EXAMPLE 9

δ-N(ethyl, β-4-morpholylethyl)aminobutyl diphenylacetate

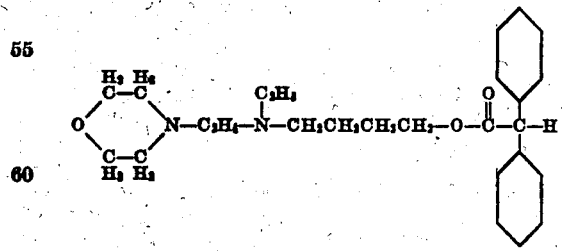

65 parts of δ-N(ethyl, β-4-morpholylethyl)amino-n-butanol were slowly added to a refluxing solution of 36 parts of diphenylacetyl chloride in 150 parts of benzene and the mixture refluxed until the reaction was completed and then cooled to room temperature. The δ-N(ethyl, β-4-morpholylethyl)aminobutanol hydrochloride which precipitated was filtered out and the benzene removed under reduced pressure. The residual product was δ-N(ethyl, β-4-morpholylethyl)aminobutyl diphenylacetate.

EXAMPLE 10

N(ethyl, β-4-morpholylethyl)aminoethyl dinaphthylacetate

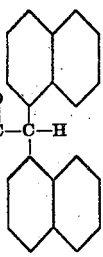

89 parts of the N(ethyl, β-4-morpholylethyl) aminoethanol were slowly added to a refluxing solution of 66 parts of dinaphthylacetyl chloride in 100 parts of benzene and the mixture refluxed until the reaction was completed and then cooled to room temperature. The N(ethyl, β-4-morpholylethyl)aminoethanol hydrochloride which precipitated was filtered out and the benzene removed under reduced pressure. The residual product, was N(ethyl, β-4-morpholylethyl)aminoethyl dinaphthylacetate.

EXAMPLE 11

N(ethyl, β-4-morpholylethyl)aminoethyl β,β-diphenylpropionate

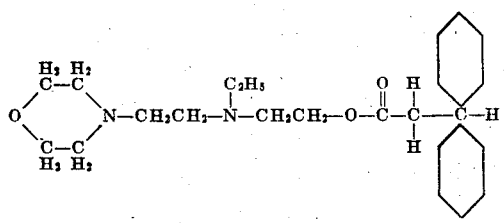

40 parts of β,β-diphenylpropionic acid were mixed with 80 parts of thionyl chloride and refluxed gently for ¾ of an hour after which the excess thionyl chloride was distilled off. The acid chloride residue was taken up in 400 parts of anhydrous ether and 58 parts of N(ethyl, β-4-morpholylethyl)aminoethanol added thereto, while the mixture was stirred and gently heated. When all the components were added the mixture was refluxed until the reaction was completed and then cooled to 10° C., and filtered. The filtrate was extracted several times with dilute hydrochloric acid, the extracts combined and the ester base precipitated therefrom with the addition of sodium carbonate, as an oily liquid. The oily liquid was taken up in ether, dried over anhydrous sodium sulfate and finally the ether distilled off. The oily liquid residue was N(ethyl, β-4-morpholylethyl)aminoethyl β,β-diphenylpropionate.

While the preceding examples have been made by the reaction of an acid chloride and the morpholino alkanol, the invention is not so limited. For example, in the cases of compounds derived from hydroxy-acids such as benzilic acid, alkoxyacids such as methoxydiphenylglycollic acid and dibasic acids such as symmetrical diphenylsuccinic acid, the acid chloride can not be prepared at all or only with great difficulty and in poor yield. Accordingly, the esters may be best formed by some type of alcoholysis. Any type of alcoholysis reaction may be used but our preferred procedure is to first form a simple alkyl ester of the acid and then carry out a catalyzed ester interchange using metallic sodium or potassium as a catalyst according to the process of the Hill and Holmes application Serial No. 431,822, filed February 21, 1942. Preferably the alcohol which is replaced by the aminoalcohol is continuously removed as it is formed. This procedure will be illustrated by the following samples.

EXAMPLE 12

N(ethyl,β-4-morpholylethyl)aminoethyl benzilate hydrochloride

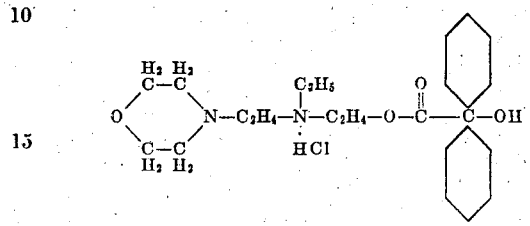

115 parts of ethyl benzilate, 225 parts of N(ethyl,β-4-morpholylethyl)aminoethanol and 0.2 part of metallic sodium were placed in a flask attached to a total-reflux variable take-off fractionating column. The pressure was reduced to 100 mm. and the heat was applied by an oil bath the temperature of which was slowly raised to 90° C. During three hours of heating 17 parts of ethanol distilled (35.5° C.). When the distillation of the ethanol became slow, the bath temperature was raised to 120° C. When the vapor temperature indicated distillation of the aminoalcohol the take-off valve was closed and the mixture was refluxed until the temperature ceased to drop. At the end of this period more parts of ethanol were distilled. The remaining aminoalcohol was slowly distilled until its stopped. The pressure was then reduced to 20 mm. and the remainder of the aminoalcohol distilled at about 70° C. During the reaction the color of the solution changed from yellow to deep red. The residue was dissolved in 500 parts of ether, washed once with dilute brine, and three times with water, dried over sodium sulfate and finally dried over calcium sulfate. 500 parts of a saturated solution of HCl in absolute ether was added and the resulting precipitate filtered. Dry HCl gas was passed into the filtrate to a slight excess and the precipitate again filtered. The combined precipitates were washed with cold acetone. The product was purified by recrystallization from acetone as fine white crystals.

EXAMPLE 13

Di-N(ethyl, β-4-morpholylethyl)aminoethyl symmetrical diphenylsuccinate

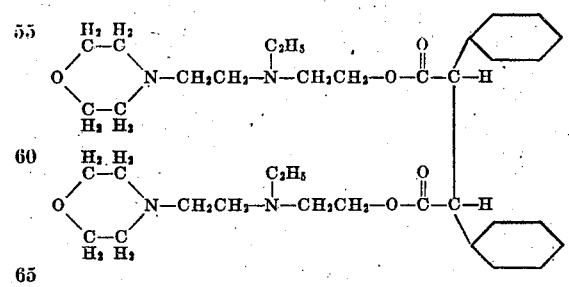

To a solution of 2 parts of sodium in 400 parts of N(ethyl,β-4-morpholylethyl)aminoethanol was added 260 parts of diethyldiphenylsuccinate and the mixture heated at about 145° C. until the reaction stopped, at the end of which period the excess N(ethyl,β-4-morpholylethyl)aminoethanol was distilled off under reduced pressure. The oily residue was twice extracted with dilute hydrochloric acid. The acid extract was washed twice with ether and a sodium carbonate solution until a precipitate formed. The precipitate was filtered out, extracted with ether and the extract added to the filtrate, the combination being dried over sodium sulfate, filtered, and the residual ether distilled off at atmospheric pressure. The oily residue was di-N(ethyl,β-4-morpholylethyl)-aminoethyl symmetrical diphenylsuccinate.

We claim:

1. A chemical compound selected from the group consisting of the esters of a carbocylic-substituted aliphatic carboxylic acid and an N(alkyl,-beta-4-morpholylalkyl)aminoalkanol and the water-soluble salts and quaternary salts of the esters.

2. A chemical compound selected from the group consisting of the esters of a diaryl-substituted aliphatic carboxylic acid and an N(alkyl,-beta-4-morpholylalkyl)aminoalkanol and the water-soluble salts and quaternary salts of the esters.

3. A chemical compound selected from the group consisting of the esters of a diaryl-substituted aliphatic carboxylic acid and an N(ethyl,-beta-4-morpholylethyl)aminoethanol and the water-soluble salts and quaternary salts of the esters.

4. A chemical compound selected from the group consisting of N(ethyl,beta-4-morpholylethyl)aminoethyl diphenylacetate, its water-soluble salts and quaternary salts.

5. A chemical compound selected from the group consisting of N(ethyl,beta-4-morpholylethyl)aminoethyl benzilate, its water-soluble salts and quaternary salts.

6. A chemical compound selected from the group consisting of N(ethyl,beta-4-morpholylethyl)aminoethyl alpha,alpha,-ditolylpropionate, its water-soluble salts and quaternary salts.

ELMORE HATHAWAY NORTHEY.
MARTIN EVERETT HULTQUIST.